United States Patent [19]

Anglade

[11] 4,068,852
[45] Jan. 17, 1978

[54] SEAL RING
[75] Inventor: Jacques Anglade, Paris, France
[73] Assignee: Le Joint Francais, Paris, France
[21] Appl. No.: 638,214
[22] Filed: Dec. 5, 1975
[30] Foreign Application Priority Data
Dec. 19, 1974 France .............................. 74 42073
[51] Int. Cl.² .............................................. F16J 15/46
[52] U.S. Cl. ............................... 277/34.3; 277/206 R;
277/208; 277/229
[58] Field of Search ................ 277/208, 34, 34.3, 229,
277/206 R, 226, 207 R

[56] References Cited
U.S. PATENT DOCUMENTS

| | | | |
|---|---|---|---|
| 2,147,771 | 2/1939 | Hathaway | 277/226 |
| 2,299,734 | 10/1942 | Betts | 277/34.3 |
| 2,776,154 | 1/1957 | Leistensnider | 277/226 |
| 2,822,192 | 2/1958 | Beatty | 277/34.3 |
| 2,893,060 | 7/1959 | Wills | 277/226 |
| 3,815,926 | 6/1974 | Vore | 277/34 |

Primary Examiner—Richard E. Aegerter
Assistant Examiner—L. Footland
Attorney, Agent, or Firm—Sughrue, Rothwell, Mion, Zinn and Macpeak

[57] ABSTRACT

Seal ring made of an elastomeric material intended to operate at a temperature at least equal to 150° C and to be in contact on its opposite sides with two mediums one of which at least is a medium emitting nuclear radiations and to be able to slide with a very slight friction coefficient in contact with a body which rotates and/or moves in a linear direction, comprising a body with an outer casing made of an elastomer which is resistant to heat and to nuclear radiations and has a low friction coefficient and with an inner casing made of a heat resisting elastomer, the outer and inner casings being closely welded to each other, the body being filled with a low-pressure gas and the inner casing being impermeable to the gas for filling the body. Application to seal rings for vessels in a radioactive medium.

6 Claims, 3 Drawing Figures

SEAL RING

The present invention concerns a seal ring made of an elastomer material intended to operate at a temperature at least equal to 150° C and to be in contact on its opposite sides with two mediums at least one of which is a medium emitting nuclear radiations, and to be able to slide with a very low friction coefficient in contact with a body which rotates and/or moves in a linear direction.

In general, use is made of silicon elastomers for seals intended to resist temperatures equal to or greater than 150° C, nuclear irradiation and friction. Such elastomers have the disadvantages of not being impermeable to gases, so that it is not possible to manufacture, therewith, inflatable seals liable to slide with a very low friction coefficient on a body which rotates and/or moves in a linear direction, such as a stopper of an enclosure intended for containing radioactive materials. Therefore, up till now, it was not possible to produce seals which simultaneously were resistant to high temperatures and ensured good sealing.

An object of the present invention is to overcome the above disadvantages and to produce a seal ring resistant to temperatures equal to or greater than 150° C and to nuclear irradiation, while ensuring practically perfect fluid-tight sealing between the mediums which it separates and sliding with a very low friction coefficient on a body which rotates and/or moves in a linear direction with respect to the latter.

The seal ring according to the invention is characterized in that it comprises a body with an outer casing made of an elastomer which is resistant to heat and to nuclear radiations and has a low friction coefficient and with an inner casing made of a heat resisting elastomer, the said outer and inner casings being closely welded to each other, the said body being filled with a gas at a relatively low pressure and the inner casing being impermeable to the gas for filling the body.

Moreover, it comprises, preferably, at least one of the following characteristics:

It comprises, on one face, two lips intended to come into contact with a body which rotates and/or moves in a linear direction and, on the opposite face, a plane portion intended to be maintained in a stationery wall;

The filling gas is the same as the gas of one of the mediums with which the seal is in contact.

Seal rings according to the invention arranged between the wall of a vessel, containing a gas at a temperature equal to or slightly greater than 150° C, as well as a radioactive material and the closing stopper of that vessel, are described hereinbelow by way of an example and with reference to the figures of the accompanying drawing.

Figure 1:
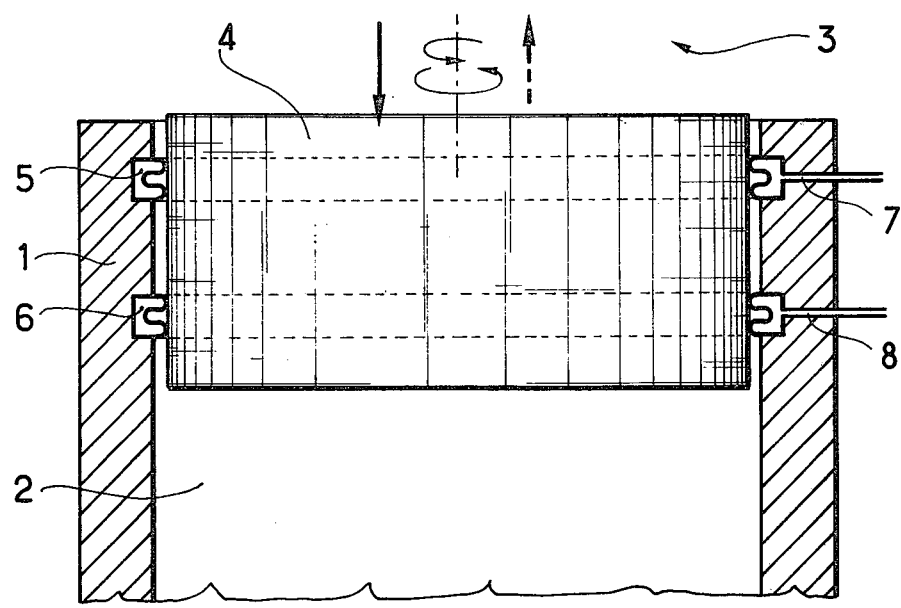
FIG. 1 shows the general arrangement of the vessel and of the seals.
Figure 2:
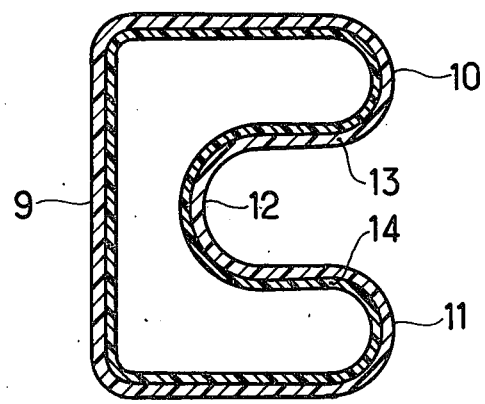
FIG. 2 shows a detailed cross-sectional view of a seal.

In FIG. 1, the wall 1 of the vessel limits a sealed enclosure 2 containing a radioactive gas at about 150° C, for example containing essentially argon and a sodium aerosol. The enclosure 2 is separated from the ambient atmosphere 3 by a stopper 4. Inflatable seals 5 and 6 which are partly embedded in the wall of the vessel, provide fluid-tight sealing, while making it possible to remove the stopper by a linear movement and/or a rotating movement, by means of any suitable system, for example a bayonet closing means or by simple vertical linear movement. Ducts 7 and 8 making it possible to ensure the inflating of the seals at a relatively low pressure, for example about 300 millibars, and to keep that pressure constant, for example by an electrovalve device, pass in the wall of the vessel.

Each of the seals comprises, on one face, a plane wall 9 and on the other face, designed to come into contact wih the stopper, two lips 10 and 11 separated by a hollowed out portion 12. The outer casing 13 of the seal is made of a silicon elastomer, and its inner casing 14 is made of an elastomer which is also resistant to heat and, moreover, impermeable to the gas contained and made, for example, of butyl rubber, of ethylene and propylene copolymer, or of vinylidene fluoride and hexachloropropylene copolymer. Those two casing are closely welded to each other, for example by vulcanization onto each other. The pressure of the gas inside the seal, which is about 300 millibars, ensures fluid-tight sealing with the slightest possible friction.

FIG. 1 shows two successive seals of that kind, to ensure more perfect fluid-tight sealing, but it is also possible to use only one seal or, on the contrary, to provide a greater number of seals if the difference in pressure between the inner enclosure and the ambient atmosphere is relatively high.

Figure 3:
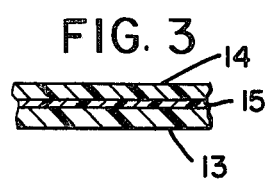
FIG. 3 shows a fragmentary cross-sectional view of an alternative embodiment of a seal.

Although the embodiment of the seal ring which has just been described may appear preferable, it will be understood that various modifications can be made thereto without going beyond the scope of the invention, it being possible to replace certain of its elements or of its materials by others which would fulfill the same technical function. More particularly, the seal can comprise an intermediate casing 15 between the outer casing and the inner casing as shown in FIG. 3, more particularly if the direct close welding of these latter to each other is difficult. The materials of the outer casing and of the inner casing can be adapted to the mediums with which they are to be put in contact.

What is claimed is:

1. Seal ring made of an elastomeric material intended to operate at a temperature at least equal to 150° C and to be in contact on its opposite sides with two gaseous fluids, one of which at least is a fluid emitting nuclear radiations, and to be able to slide with a very slight friction coefficient in contact with a body which rotates and/or moves in a linear direction, comprising an outer casing made of an elastomer which is resistant to heat and to nuclear radiations and has a low friction coefficient, an inner casing made of a heat resistant elastomer, and an intermediate casing closely welded to both said outer casing and said inner casing, said seal ring being filled with a gas at a relatively low pressure and said inner casing being impermeable to said gas.

2. Seal ring according to claim 1 wherein said outer casing is made of a silicon elastomer.

3. Seal ring according to claim 2 wherein said inner casing is made from an elastomer selected from the group consisting of butyl rubber, ethylene and propylene copolymer, and vinylidene fluoride and hexachloropropylene copolymer.

4. Seal ring according to claim 1 wherein said inner casing is made from an elastomer selected from the group consisting of butyl rubber, ethylene and propylene copolymer, and vinylidene fluoride and hexachloropropylene copolymer.

5. Seal ring according to claim 1, characterized in that it comprises, on one face, two lips intended to come into contact with the body which is liable to rotate and/or move in a linear direction and on the other face, a plane portion intended to be maintained in a stationery wall.

6. Seal ring according to claim 1, characterized in that said gas is the same as the gas of one of the mediums with which the seal is in contact.

* * * * *